United States Patent
Szita et al.

(10) Patent No.: US 9,633,682 B1
(45) Date of Patent: Apr. 25, 2017

(54) ACCURATE SPIRAL GATE POSITIONING IN THE PRESENCE OF LARGE NON-REPEATABLE RUNOUT

(71) Applicant: KABUSHIKI KAISHA TOSHIBA, Tokyo (JP)

(72) Inventors: Gabor Szita, Mountain View, CA (US); Jiangang Liang, San Jose, CA (US)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/882,339

(22) Filed: Oct. 13, 2015

(51) Int. Cl.
*G11B 21/02* (2006.01)
*G11B 5/596* (2006.01)

(52) U.S. Cl.
CPC ...... *G11B 5/59627* (2013.01); *G11B 5/59688* (2013.01)

(58) Field of Classification Search
None
See application file for complete search history.

(56) References Cited

U.S. PATENT DOCUMENTS

| 7,123,433 B1 | 10/2006 | Melrose et al. |
| 7,158,336 B2 | 1/2007 | Chan et al. |
| 7,230,786 B1 * | 6/2007 | Ray ............... G11B 5/59611 360/75 |
| 7,499,234 B1 * | 3/2009 | Rigney ............ G11B 5/59638 360/75 |
| 7,773,334 B1 | 8/2010 | Rutherford | |

* cited by examiner

*Primary Examiner* — K. Wong
(74) *Attorney, Agent, or Firm* — Patterson & Sheridan, LLP

(57) ABSTRACT

A magnetic write head is positioned based on position signals generated by a read head as the read head crosses a plurality of reference spirals. The spiral gate for monitoring a particular reference spiral is timed to begin at a time based on the radial position of the magnetic head when crossing the preceding reference spiral. In this way, the spiral crossing time for the particular reference spiral can be estimated with sufficient accuracy that the spiral gate coincides with the magnetic head crossing the particular reference spiral. Consequently, spiral detection is assured, even in the presence of large non-repeatable runout.

20 Claims, 8 Drawing Sheets

ACCURATE SPIRAL GATE POSITIONING IN THE PRESENCE OF LARGE NON-REPEATABLE RUNOUT

BACKGROUND

Field

Embodiments described herein relate generally to data storage units, systems, and methods for accurate spiral gate positioning in the presence of large non-repeatable runout.

Description of the Related Art

In a typical hard disk drive (HDD), servo sectors on the disk are used to provide position information about the location of a magnetic head over a disk surface. A common approach for writing such servo information on each disk surface in an HDD is referred to as spiral-based self-servo writing, or spiral-based SSW. According to this approach, spiral-shaped servo information (or "servo spirals") is written on at least one disk surface prior to the SSW process. During the SSW process, a spiral-based servo system is employed to write the servo sectors, in which each magnetic head of the HDD is positioned relative to a disk surface based on the servo spirals. In this way, the final servo information on each disk surface can be written by the magnetic heads.

In a spiral based servo system, the read channel and drive firmware of the HDD determine the head position based on the timing and amplitude characteristics of the signal generated when the head crosses a spiral. Two possible approaches for detecting such spiral crossings are continuous spiral demodulation, also referred to as spiral search mode, and windowed spiral demodulation.

In continuous spiral demodulation, the read channel continuously monitors the signal from the head and uses a suitable algorithm to detect when a spiral crossing occurs. A serious disadvantage of this approach is that stray signals left on the media may be misinterpreted as spiral crossings, causing erratic servo behavior and even failure of the HDD. In windowed spiral demodulation, the read channel monitors spiral crossings only during predefined and relatively short time intervals, typically referred to as spiral gates, thereby greatly reducing the potential for stray signals from affecting servo behavior. Windowed spiral demodulation mode requires approximate knowledge of when each spiral crossing will occur, so that the spiral demodulation window for that spiral can be timed to coincide with when the spiral is being crossed by the head. Typically, spiral locations on the media can be characterized accurately by suitable firmware algorithms, and spiral demodulation windows can be reliably activated near the appropriate spiral crossing. However, when the head experiences high non-repeatable runout (NRRO), significant unpredictable variation of spiral crossing times generally results, causing missed spiral detection. High NRRO is common for a head servoing on widely spaced spirals, such as the so-called "bootstrap spirals" that are written on a disk as part of a blank disk SSW process.

In light of the above, neither windowed spiral demodulation nor continuous spiral demodulation can provide robust spiral detection in an SSW process that uses widely spaced spirals. Accordingly, there is a need in the art for a method of positioning a magnetic head during an SSW process in the presence of large NRRO of the head position.

SUMMARY

One or more embodiments provide systems and methods for positioning a magnetic head during a self-servo writing process. In some embodiments, a spiral gate for monitoring a reference spiral is timed to begin based on the radial position of the magnetic head when crossing the preceding reference spiral. In other embodiments, a spiral gate is timed to begin based on both the radial position and the radial velocity of the magnetic head when crossing the preceding reference spiral. Using the most recently measured radial position and/or radial velocity of the magnetic head to estimate the location and timing of the next spiral crossing enables accurate spiral gate positioning for the next spiral crossing, thereby avoiding missed spiral detection.

A method of positioning a write head based on position signals generated by a read head as the read head crosses a plurality of reference spirals, including first and second spirals that are adjacent, according to an embodiment, the method comprising demodulating the position signals generated by the read head as the read head crosses the first spiral over a first demodulation period, and demodulating the position signals generated by the read head as the read head crosses the second spiral over a second demodulation period that is determined based on the demodulated position signals obtained during the first demodulation period.

A data storage device, according to another embodiment, comprises a rotatable disk with a writable surface, and a controller. The controller is configured to position a write head based on position signals generated by a read head as the read head crosses a plurality of reference spirals, including first and second spirals that are adjacent by demodulating the position signals generated by the read head as the read head crosses the first spiral over a first demodulation period, and demodulating the position signals generated by the read head as the read head crosses the second spiral over a second demodulation period that is determined based on the demodulated position signals obtained during the first demodulation period.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
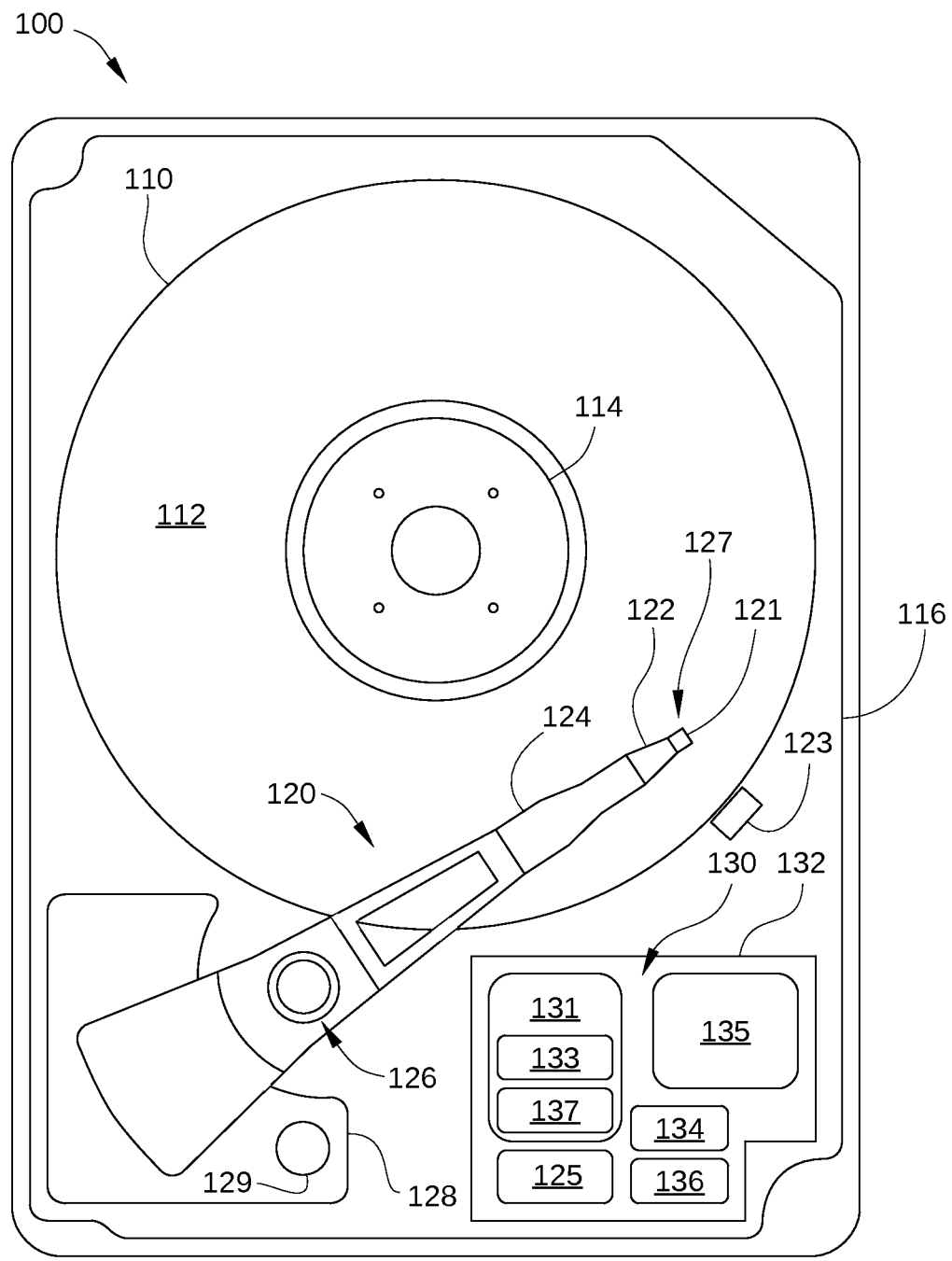
FIG. 1 is a schematic view of an exemplary hard disk drive, according to one embodiment.

FIG. 1 is a schematic view of an exemplary hard disk drive, according to one embodiment. For clarity, hard disk drive (HDD) 100 is illustrated without a top cover. HDD 100 includes at least one storage disk 110 that is rotated by a spindle motor 114 and includes a plurality of concentric data storage tracks are disposed on a surface 112 of storage disk 110. Spindle motor 114 is mounted on a base plate 116. An actuator arm assembly 120 is also mounted on base plate 116, and has a slider 121 mounted on a flexure arm 122 with a magnetic read/write head 127 that reads data from and writes data to the data storage tracks. Flexure arm 122 is attached to an actuator arm 124 that rotates about a bearing assembly 126. Voice coil motor 128 moves slider 121 relative to storage disk 110, thereby positioning read/write head 127 over a desired concentric data storage track. Spindle motor 114, read/write head 127, and voice coil motor 128 are coupled to electronic circuits 130, which are mounted on a printed circuit board 132.

Electronic circuits 130 include a read/write channel 137, a microprocessor-based controller 133, random-access memory (RAM) 134 (which may be a dynamic RAM and is used as a data buffer) and/or a flash memory device 135 and a flash manager device 136. In some embodiments, read/write channel 137 and microprocessor-based controller 133 are included in a single chip, such as a system-on-chip 131. In some embodiments, HDD 100 may further include a motor-driver chip that accepts commands from microprocessor-based controller 133 and drives both spindle motor 114 and voice coil motor 128. Read/write channel 137 communicates with the read/write head 127 via a preamplifier (not shown) that may be mounted on a flex-cable that is itself mounted on base plate 116 or actuator arm 120, or both.

HDD 100 also includes an inner diameter (ID) crash stop 129 and a load/unload ramp 123. ID crash stop 129 is configured to restrict motion of actuator arm assembly 120 to preclude damage to read/write head 127 and/or storage disk 110. Load/unload ramp 123 is typically disposed proximate the outer diameter (OD) of storage disk 110 and is configured to unload read/write head 127 from storage disk 110. Typically, at the beginning of a self servo writing (SSW) process, actuator arm assembly 120 is pushed against ID crash stop 129, so that ID crash stop 129 may serve as a position reference at the start of the SSW process.

For clarity, HDD 100 is illustrated with a single storage disk 110 and a single actuator arm assembly 120. HDD 100 typically includes multiple storage disks and multiple actuator arm assemblies. In addition, each side of storage disk 110 typically has a corresponding read/write head associated therewith and coupled to a flexure arm.

When data are transferred to or from storage disk 110, actuator arm assembly 120 sweeps an arc between the ID and the OD of storage disk 110. Actuator arm assembly 120 accelerates in one angular direction when current is passed in one direction through the voice coil of voice coil motor 128 and accelerates in an opposite direction when the current is reversed, thereby allowing control of the position of actuator arm assembly 120 and attached read/write head 127 with respect to storage disk 110. Voice coil motor 128 is coupled with a servo system known in the art that uses the positioning data read from servo wedges on storage disk 110 by read/write head 127 to determine the position of read/write head 127 over a specific data storage track. The servo system determines an appropriate current to drive through the voice coil of voice coil motor 128, and drives said current using a current driver and associated circuitry.

In order for HDD 100 to perform SSW and write the above-described servo wedges on storage disk 110 with the necessary precision for proper operation of HDD 100, position and timing information are provided to the disk drive servo system of HDD 100. The position and timing information that enable the internal servo system of HDD 100 to perform SSW is typically in the form of reference spiral tracks or "servo spirals" written on storage disk 110. One embodiment of such servo spirals is illustrated in FIG. 2.

Figure 2:
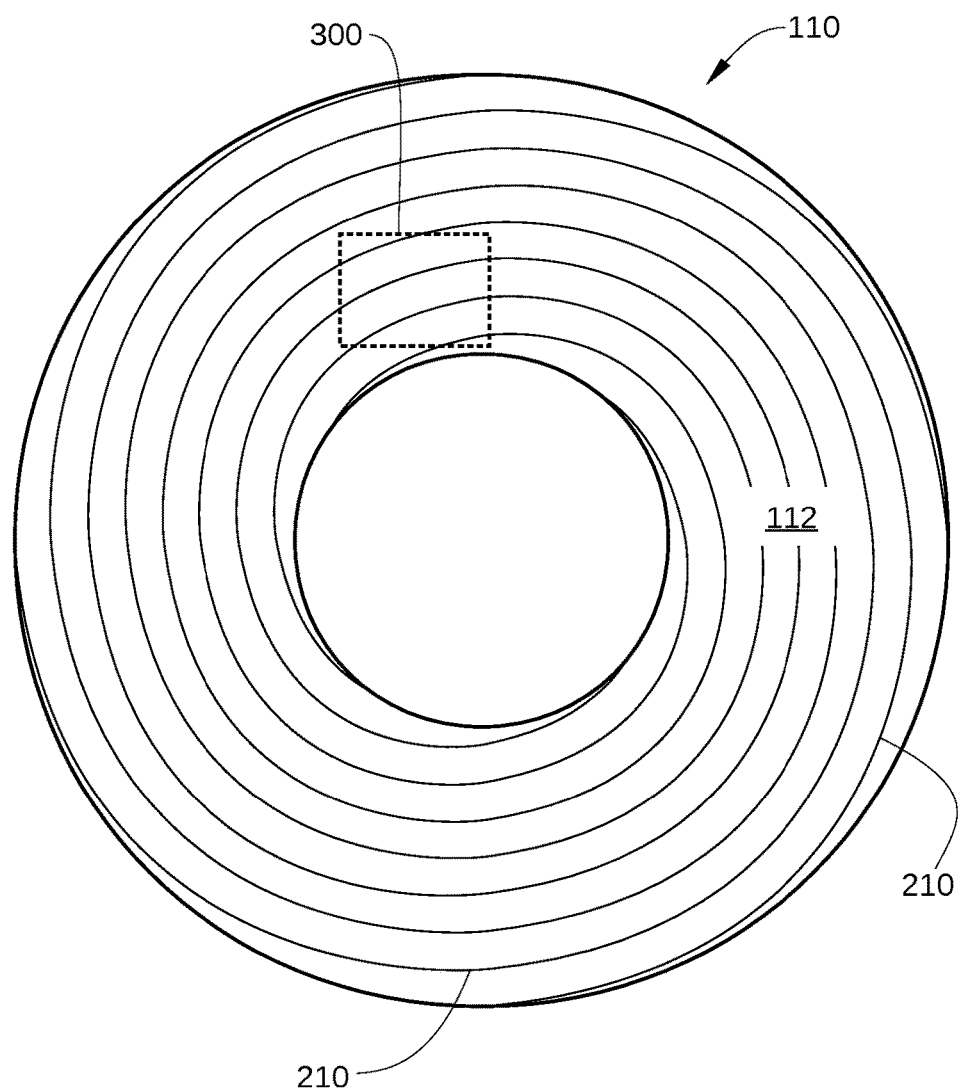
FIG. 2 illustrates a storage disk of the hard disk drive of FIG. 1 prior to undergoing a servo self-write process, according to one embodiment.

FIG. 2 illustrates storage disk 110 prior to undergoing an SSW process, according to one embodiment. As shown, storage disk 110 has a plurality of reference spirals 210 written thereon that are circumferentially spaced from adjacent reference spirals 210. Reference spirals 210 may be written onto a substantially blank surface 112 of storage disk 110 using read/write head 127 and the servo system of HDD 100 with a boot-strap spiral-writing process, with an external media writer before assembly of HDD 100, or with a servo writing machine that uses an external precision actuator to position the disk drive actuator. Reference spirals 210 enable the generation of servo wedges on storage disk 110 using closed-loop control in the servo system of HDD 100. That is, servo wedges can be written while the servo system of HDD 100 uses closed-loop tracking of reference spirals 210. It is noted that the number of reference spirals 210 written on storage disk 110 is generally larger than that shown in FIG. 2, for example as few as ten or twenty, or as many as several hundred.

During the SSW process, the servo system of HDD 100 uses the timing and position information provided by the above-described reference spirals 210 to servo precisely over a radial position on storage disk 110 corresponding to a particular concentric data storage track. Thus, while the read head of read/write head 127 is used to read position and timing information from reference spirals 210, the write head of read/write head 127 is used to write servo wedges for a radial position on storage disk 110, i.e., for a particular data storage track of storage disk 110. In some embodiments, the read head of a read/write head 127 may read position and timing information from one storage disk surface while the write head of a different read/write head 127 writes the servo wedges on a different storage disk surface.

Figure 3:
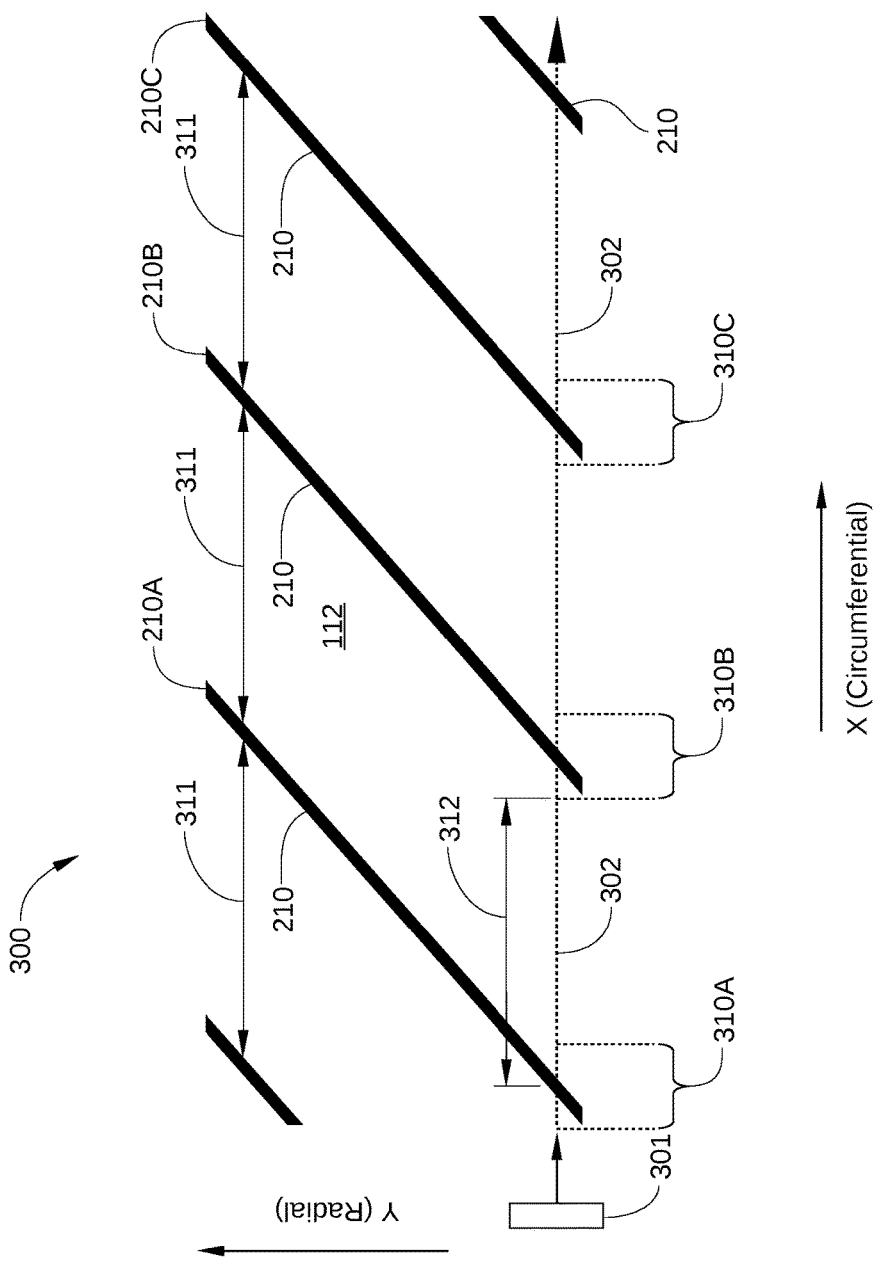
FIG. 3 is a schematic illustration of a portion of a storage disk indicated in FIG. 2 prior to undergoing a servo self-write process, where reference spirals are ideally formed.

FIG. 3 is a schematic illustration of a portion 300 of storage disk 110 indicated in FIG. 2 prior to undergoing an SSW process, where reference spirals 210 are ideally formed. As shown, a plurality of reference spirals 210 (individually labeled 210A-210C) are formed on storage disk 110. Displacement along the x-axis in FIG. 3 is illustrated in terms of circumferential angular displacement, such as radians or degrees, while displacement along the y-axis in FIG. 3 is illustrated in terms of radial linear displacement, such as data tracks, micrometers, or the like. Furthermore, assuming that read/write head 127 has written each of reference spirals 210 on storage disk 110 using the same radial velocity profile, reference spirals 210 can be considered to be circumferentially separated from each other by a substantially uniform distance 311 at any particular radial location on storage disk 110. Thus, reference spirals 210 are depicted in FIG. 3 as parallel, uniformly spaced lines. It is noted that because storage disk 110 rotates at a constant rotational velocity, displacement along the x-axis in FIG. 3 also corresponds to a displacement in time.

Also included in FIG. 3 is a read element 301 of read/write head 127 shown following an ideal head path 302 across reference spirals 210A-210C. As read element 301 crosses each of reference spirals 210A-210C, a corresponding spiral gate 310A-310C is opened, where each spiral gate 310A-310C graphically depicts a time interval during which read/write channel 137 of HDD 100 monitors signals generated by read element 301. As shown, ideal head path 302 remains at a constant radial location as read element 301 crosses reference spirals 210. As a result, each reference spiral 210 is circumferentially separated from adjacent reference spirals 210 by uniform distance 311, and read element 301 crosses references spirals 210 at substantially uniform time intervals. Consequently, accurately determining the time at which a particular spiral gate should be opened, i.e., while read element 301 crosses the next reference spiral, is a straight-forward calculation. For instance, once read element 301 crosses reference spiral 210A, spiral gate 310B should be opened at a time that corresponds to read element 301 traveling known distance 312. In this way, read/write channel 137 is ensured to be monitoring signals generated by read element 301 as read element 301 crosses reference spiral 210B. For simplicity, ideal head path 302 is depicted as a horizontal line, representing movement along a constant radial location on disk 112. Generally, ideal head path 302 may be oriented at other angles with respect to the x-axis, and may not be a straight line.

In practice, due to factors that affect the precise positioning of a write head while reference spirals 210 are being written on storage disk 110, such as mechanical vibration, disk flutter, and the like, reference spirals 210 are generally neither parallel to each other nor uniformly spaced from each other. Because each of reference spirals 210 is generally not separated from adjacent reference spirals 210 by uniform distance 311, the time required for read element 301 to travel from one to another of reference spirals 210 varies between each pair of adjacent reference spirals, as illustrated in FIG. 4.

Figure 4:
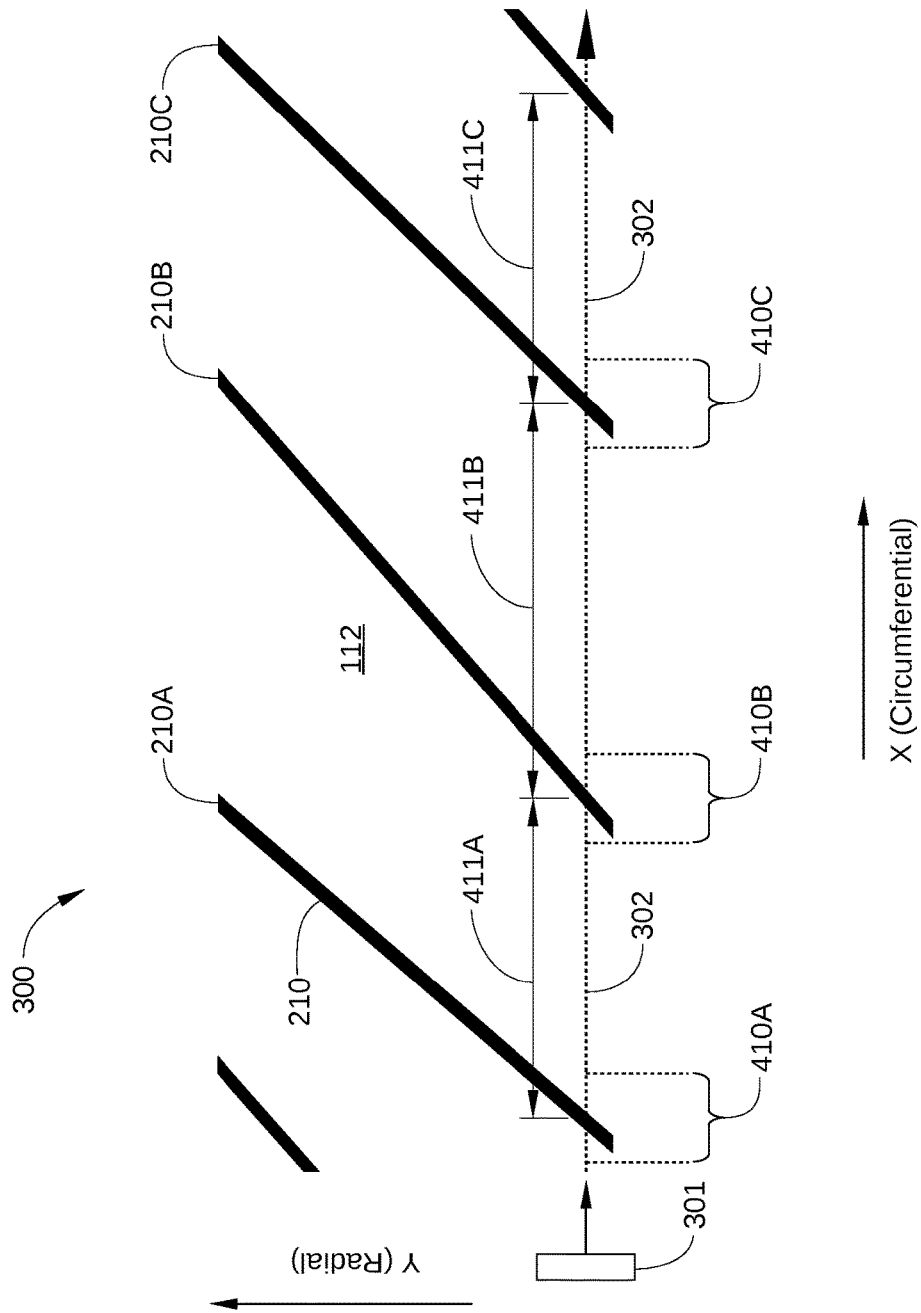
FIG. 4 is a schematic illustration of the portion of the storage disk indicated in FIG. 2 prior to undergoing a servo self-write process, where reference spirals are not ideally formed.

FIG. 4 is a schematic illustration of portion 300 of storage disk 110 indicated in FIG. 2 prior to undergoing an SSW process, where reference spirals 210 are not ideally formed. Similar to FIG. 3, reference spirals 210A-210C are formed on storage disk 110, displacement along the x-axis in FIG. 4 is illustrated in terms of circumferential angular displacement, and displacement along the y-axis in FIG. 4 is illustrated in terms of radial linear displacement. In addition, as read element 301 crosses one of reference spirals 210A-210C, a corresponding spiral gate 410A-410C is opened, where each spiral gate 410A-410C graphically depicts a time interval during which read/write channel 137 of HDD 100 monitors signals generated by read element 301.

Unlike the ideally formed reference spirals 210 in FIG. 3, in FIG. 4 reference spirals 210 are generally not circumferentially separated from each other by a substantially uniform distance at a particular radial location. Instead, due to unique variations in the shape of each reference spiral 210A-210C, at any particular radial location on storage disk 110, reference spirals 210A-210C are separated by random circumferential distances 411A-411C as shown. That is, each of circumferential distances 411A-411C may vary relative to the other circumferential distances 411A-411C. For example, at the radial location corresponding to ideal head path 302, reference spirals 210A and 210B are separated by circumferential distance 411A, which is significantly less than circumferential distance 411B separating reference spirals 210B and 210C.

The presence of random circumferential distances 411A-411C between reference spirals 210A-210C is well-known in the art. Because each of random circumferential distances 411A-411C is fixed, these circumferential distances can be accurately determined, for example by averaging measurements for each reference spiral 210A-210C over multiple rotations of storage disk 110. Thus, even though each of reference spirals 210A-210C can be separated by a different circumferential distance 411A-411C, accurately determining the time at which a spiral gate should be opened for a particular reference spiral 210, i.e., while read element 301 crosses the reference spiral, is a straight-forward calculation. However, in some situations, the presence of large non-repeatable runout (NRRO) of read element 301 from ideal head path 302 results in significant unpredictable variation of spiral crossing times, as illustrated in FIG. 5.

Figure 5:
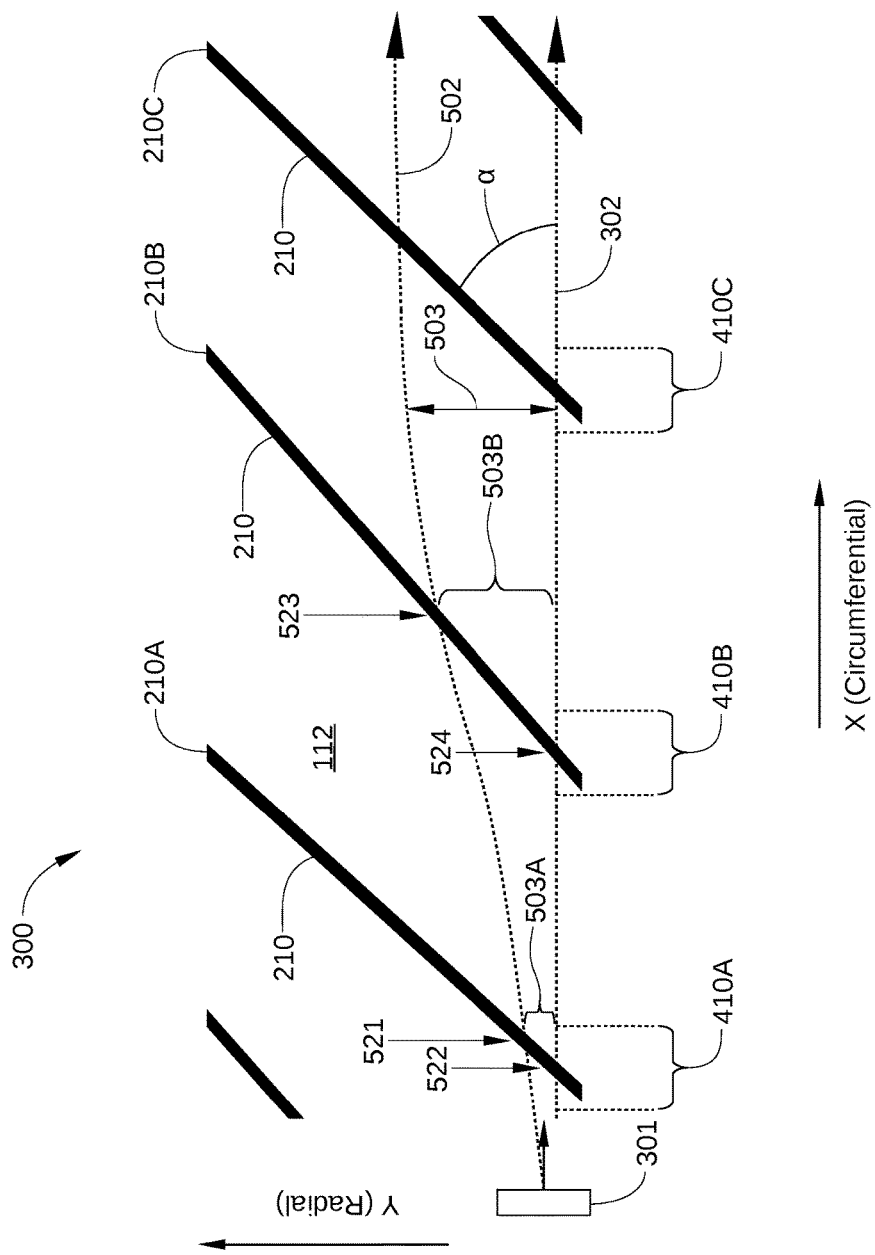
FIG. 5 is a schematic illustration of the portion of the storage disk indicated in FIG. 2 prior to undergoing an SSW process, where reference spirals are not ideally formed and the radial position of a read element includes significant non-repeatable runout.

FIG. 5 is a schematic illustration of portion 300 of storage disk 110 indicated in FIG. 2 prior to undergoing an SSW process, where reference spirals 210 are not ideally formed and the radial position of read element 301 includes significant NRRO. Similar to FIG. 4, reference spirals 210A-210C may be formed on storage disk 110 separated by random circumferential distances 411A-411C (not shown for clarity). In contrast to FIG. 4, read element 301 in FIG. 5 is depicted following an actual head path 502.

During operation of HDD 100, actual head path 502 is generally offset from ideal head path 302 by some radial distance 503, sometimes referred to as NRRO. Read element 301 follows actual head path 502 instead of ideal head path 302 due to perturbations in radial location caused by mechanical vibrations, inaccuracies in the position and timing information included in one or more of reference spirals 210A-210C, etc.

Generally, the magnitude of radial distance 503 is greater than zero, but is too small to affect the timing of spiral gates. For example, as read element 301 follows actual head path 502 over reference spiral 210A, read element 301 is radially offset from ideal head path 302 by a radial distance 503A. Therefore, read element 301 crosses reference spiral 210A at an actual circumferential location 521 that is different than an ideal circumferential location 522. Because radial distance 503A is small relative to the circumferential portion of surface 112 that corresponds to spiral gate 410A, actual circumferential location 521 still falls within that circumferential portion, which is substantially centered on ideal circumferential location 522. Thus, because circumferential location 521 is disposed the circumferential portion of surface 112 that corresponds to spiral gate 410A, the NRRO of read element 301 when crossing reference spiral 210A (i.e., radial distance 503A) does not result in missed spiral detection of reference spiral 210A.

However, when NRRO is relatively large, spiral crossing times can vary significantly and randomly from the ideal crossing time, resulting in missed spiral detection of one or more reference spirals 210A-210C. For example, as read element 301 follows actual head path 502 over reference spiral 210B, read element 301 is radially offset from ideal head path 302 by a radial distance 503B, and therefore read element 301 crosses reference spiral 210B at an actual circumferential location 523 that is significantly different than an ideal circumferential location 524. Because radial distance 503B is so large relative to the circumferential portion of disk surface 112 that corresponds to spiral gate 410B, actual circumferential location 523 falls outside the circumferential portion of disk surface 112 that corresponds to spiral gate 410B. Thus, when read element 301 crosses one of reference spirals 210A-210C with sufficiently large NRRO, missed spiral detection of the reference spiral being crossed occurs.

According to embodiments of the invention, accurate spiral gate positioning with respect to reference spirals 210 is enabled, even in the presence of large non-repeatable runout. Specifically, a spiral gate for a particular reference spiral is timed to begin based on the radial position of read/write head 127, or read element 301, when crossing the preceding reference spiral. It is noted that the effect of NRRO on the actual time read element 301 crosses a reference spiral 210 deviates from the nominal spiral crossing time for that spiral can be expressed as $\Delta t_n = \Delta p_n * \text{atan}(\alpha)$, where $\Delta p_n$ is the NRRO at spiral n, $\Delta t_n$ is the deviation of actual spiral crossing time from the nominal crossing time at spiral n, and $\alpha$ is the angle between the spirals and ideal head path 302, as shown in FIG. 5. Because NRRO is typically dominated by mechanically induced disturbances, the dominant frequency components of NRRO are generally significantly lower than the spiral crossing frequency. Consequently, the difference of NRRO between adjacent spirals can be assumed to be small, such that $\Delta p_{n+1} \approx \Delta p_n$. Therefore, the deviation of the next spiral crossing time from the nominal value can be approximated from the NRRO measured at the current spiral: $\Delta t_{n+1} = \Delta p_n * \text{atan}(\alpha)$, where $\Delta t_{n+1}$ is the deviation of actual spiral crossing time from the nominal crossing time at spiral n+1.

In light of the above, according to some embodiments, the radial position measurement obtained at a spiral crossing provides a value of NRRO for read element 301 when crossing the reference spiral, and this value of NRRO is then used to predict the approximate spiral crossing time for the following reference spiral. Based on this predicted spiral crossing time, the timing of the spiral gate is adjusted accordingly. One such embodiment is illustrated in FIG. 6.

Figure 6:
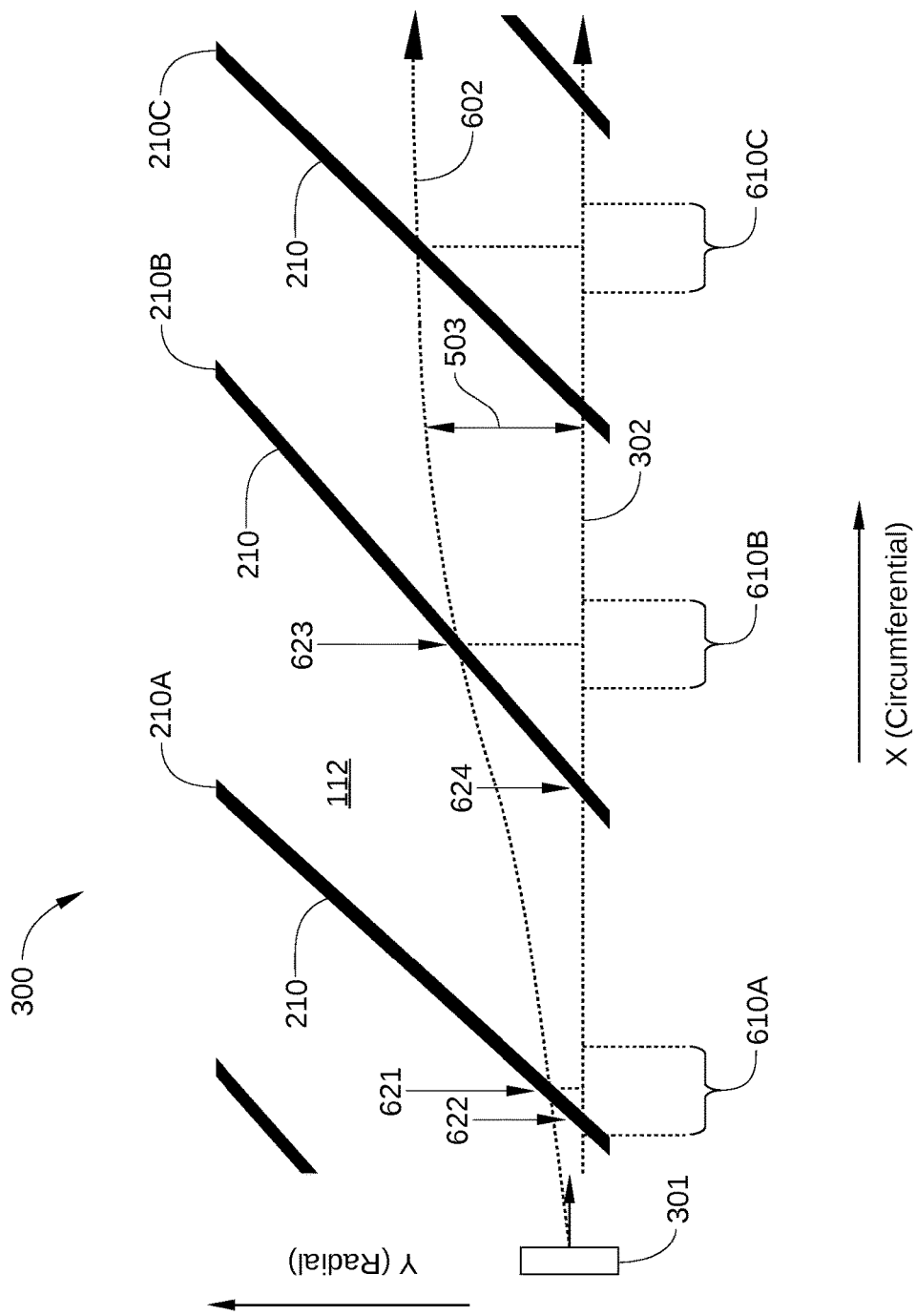
FIG. 6 is a schematic illustration of the portion of the storage disk indicated in FIG. 2 prior to undergoing an SSW process, with spiral gates positioned according to some embodiments.

FIG. 6 is a schematic illustration of portion 300 of storage disk 110 indicated in FIG. 2 prior to undergoing an SSW process, with spiral gates positioned according to some embodiments. Similar to FIG. 5, reference spirals 210A-210C may be formed on storage disk 110 separated by random circumferential distances 411A-411C (omitted in FIG. 6 for clarity), and read element 301 is depicted following an actual head path 602.

As shown, there is a respective spiral gate 610A-610C for each of reference spirals 210A-210C. Furthermore, each spiral gate 610A-610C is substantially centered on an actual spiral crossing time for the corresponding reference spiral. For example, spiral gate 610A is substantially centered on an actual spiral crossing time 621 of reference spiral 210A (rather than on an ideal spiral crossing time 622), spiral gate 610B is substantially centered on actual spiral crossing time 623 of reference spiral 210B (rather than on an ideal spiral crossing time 624), and so on. As described above, the timing of each spiral gate, i.e., the circumferential position at which the spiral gate is opened, is determined based on the radial position (NRRO) of read element 301 relative to ideal head path 302. Thus, even in the presence of NRRO that is comparatively large relative to the circumferential portions of disk surface 112 that correspond to spiral gates 610A-610C, missed spiral detection can be avoided.

In some embodiments, a more complex prediction may be made to determine the timing of spiral gates 610A-610C. For example, in some embodiments, the timing of a spiral window for a particular reference spiral may be based on both the radial position and the radial velocity of read element 301 when crossing the reference spiral immediately preceding the particular reference spiral. In such embodiments, the radial velocity of read element 301 at a reference spiral may be calculated based on a difference in radial position of read element 301 at the reference spiral and at one or more preceding reference spirals. Thus, in such embodiments, the timing of a spiral window for a particular reference spiral may be based on the radial position of multiple preceding reference spirals. For example, when the timing of spiral gate 610C is based on the radial position and radial velocity of read element 301 when crossing spiral gate 610B, the radial velocity of read element 301 at spiral gate 610B may be based on the radial position of read element 301 when crossing spiral gate 610A and 610B. Furthermore, the timing of a spiral window for a particular reference spiral may be determined using any other suitable calculation that is based on the radial location of read element 301 when crossing a preceding reference spiral.

In practice, NRRO may include significant high frequency measurement noise, which may affect the measured position of read element 301 and degrade the accuracy of the predicted spiral gate determination, as set forth above. In some embodiments, NRRO measurements, i.e., the demodulated position signals generated when read element 301 passes over a reference spiral, may be filtered. Specifically, NRRO measurements may be passed through a suitable low-pass filter before being used to determine predicted spiral crossings.

Figure 7:
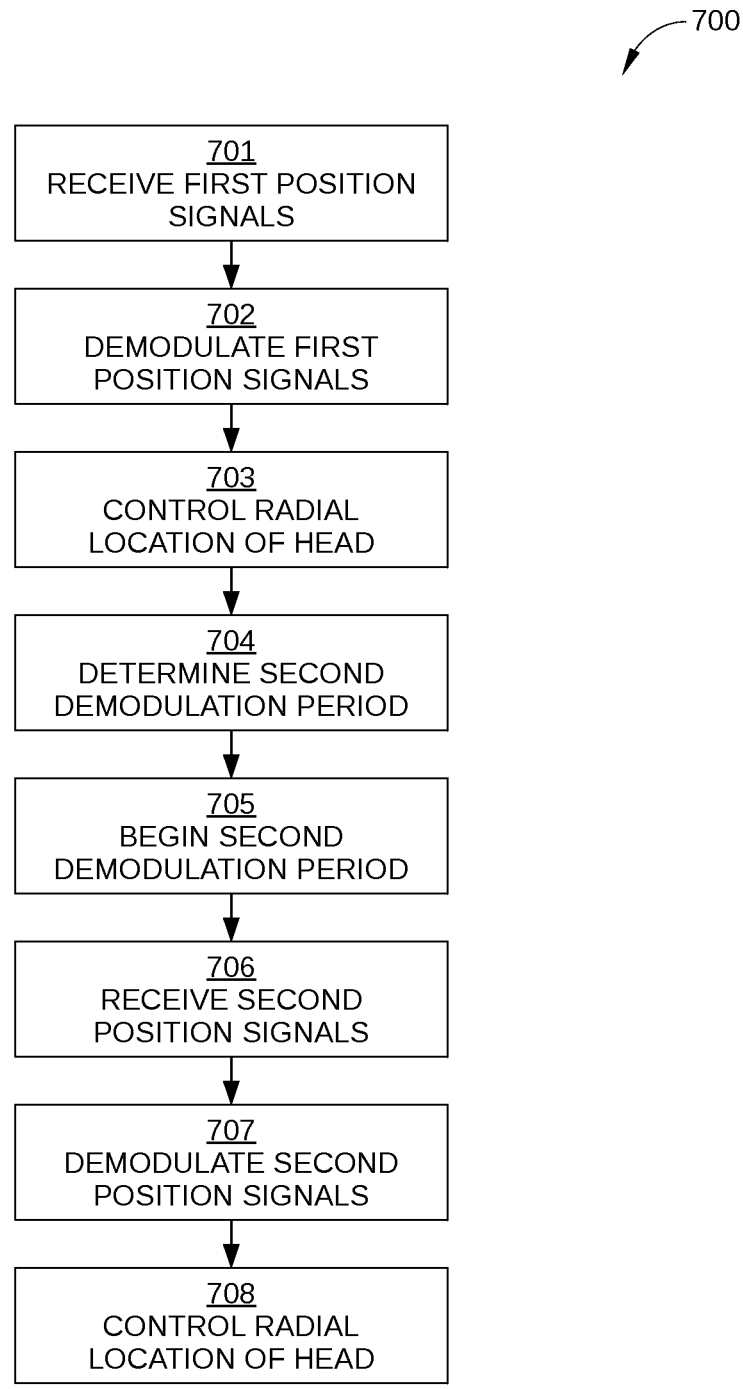
FIG. 7 sets forth a flowchart of method steps for positioning a write head based on position signals generated by a read head as the read head crosses a plurality of reference spirals, according to an embodiment.

FIG. 7 sets forth a flowchart of method steps for positioning a write head based on position signals generated by a read head as the read head crosses a plurality of reference spirals, according to an embodiment. For example, the method steps of FIG. 7 may be employed to position a write head during an SSW process. Although the method steps are described in conjunction with HDD 100 in FIGS. 1-6, persons skilled in the art will understand that the method steps may be performed with other types of systems. The control algorithms for the method steps according to the embodiment reside in microprocessor-based controller 133, or alternatively, in some other embodiments, an external host device. For clarity of description, controller 133 is assumed to perform said control algorithms for the method steps, although other external control devices can potentially be used in such a role.

As shown, a method 700 begins at step 701, when microprocessor-based controller 133 receives first position signals generated by read/write head 127, for example via read element 301, as read element 301 crosses a first reference spiral 210. For instance, microprocessor-based controller 133 may receive the first position signals as read element 301 passes over reference spiral 210B in FIG. 6. Prior to crossing the first reference spiral 210, microprocessor-based controller 133 begins a first demodulation period, that is, microprocessor-based controller 133 opens a spiral gate or demodulation window. During the first demodulation period, microprocessor-based controller 133 monitors the position signals generated by read/write head 127. Microprocessor-based controller 133 determines the timing of the first demodulation period so that read element 301 crosses the first reference spiral during the first demodulation period. For example, microprocessor-based controller 133 may determine the timing for the first demodulation period using the techniques for determining a timing for a second demodulation period, set forth below in steps 702 and 703.

In step 702, microprocessor-based controller 133 demodulates the position signals received in step 701. Generally, demodulating the position signals includes determining a first radial position of a write head. In some embodiments, the write head may include the write element of read/write head 127, which is the magnetic head associated with the surface on which reference spirals 210 are written. In other embodiments, the write head may instead include the write element of a read/write head associated with a different storage disk surface.

In step 703, based on the first radial position determined in step 702, microprocessor-based controller 133 controls the radial position and/or radial velocity of the write head. For example, the first radial position indicates the current NRRO of read/write head 127, i.e., the radial offset from the ideal or intended radial location of read/write head 127. Based on this offset, microprocessor-based controller 133 may cause read/write head 127 to move, via voice coil motor 128, from the first radial position to a different radial position. In some embodiments, microprocessor-based controller 133 may also control the radial velocity and acceleration of read/write head 127 based on the radial offset indicated by the first radial position.

In step 704, microprocessor-based controller 133 determines a second demodulation period during which to monitor position signals generated by read/write head 127. Specifically, the second demodulation period is selected so that a predicted crossing time at which read/write head 127 crosses a second reference spiral occurs during the second demodulation period, where the second reference spiral is adjacent to the first reference spiral 210. For instance, when the first reference spiral 210 is reference spiral 210B in FIG. 6, the second reference spiral would be reference spiral 210C in FIG. 6. To that end, in some embodiments, microprocessor-based controller 133 determines the predicted crossing time based on the first radial position of the above-described write head determined in step 702. Then, based on the predicted crossing time, microprocessor-based controller 133 can select an appropriate start time for the second demodulation period. In some embodiments, the appropriate start time is selected so that the second demodulation period is substantially centered about the predicted crossing time. In this way, even when the radial position of read/write head 127 includes large NRRO while crossing the first reference spiral, the predicted crossing time of read/write head 127 over the second reference spiral occurs during the second demodulation window, thereby avoiding missed spiral detection of the second reference spiral.

In some embodiments, microprocessor-based controller 133 determines the predicted crossing time in step 704 based on the radial position of multiple preceding reference spirals rather than the immediately preceding reference spiral. For example, the timing of the second demodulation period may be based in part on the radial velocity of read/write head 127 at the first reference spiral (which may be calculated based on a difference in radial position of read/write head 127 at the first reference spiral and at the reference spiral immediately preceding the first reference spiral). Alternatively, the timing of the second demodulation period may be based on the radial position of read/write head 127 at the first reference spiral and at one or more reference spirals immediately preceding the first reference spiral. Thus, method 700 as described may employ the radial position of read/write head 127 during the immediately preceding demodulation period or the radial position of read/write head 127 during the immediately preceding n demodulation periods, where n is two or more.

It is noted that in step 704, calculation of the predicted crossing time of read/write head 127 of the second reference spiral generally includes compensation for the unique variations in the shape of each reference spiral 210 at any particular radial location on storage disk 110. Thus, the predicted crossing time of read/write head 127 is also based on the well-known variable circumferential distances 411A-411C shown in FIG. 4, which include, at a particular radial location, the circumferential offset of each reference spiral from the ideal reference spiral location. For example, in determining the predicted crossing time of read/write head 127 over reference spiral 210C, microprocessor-based controller 133 includes the circumferential distance 411C in the calculation.

In step 705, microprocessor-based controller 133 begins the second demodulation period determined in step 704. As shown in FIG. 6, the second demodulation window is positioned in time to include the predicted crossing time of read/write head 127 over the second reference spiral. In step 706, microprocessor-based controller 133 receives second position signals generated by read/write head 127, for example via read element 301, as read element 301 crosses the second reference spiral 210. For instance, microprocessor-based controller 133 may receive the second position signals as read element 301 passes over reference spiral 210C in FIG. 6. In step 707, microprocessor-based controller 133 demodulates the position signals received in step 706. Generally, demodulating the position signals includes determining a second radial position of the above-described write head.

In step 708, based on the second radial position determined in step 707, microprocessor-based controller 133 controls the radial position and/or radial velocity of the write head. For example, the second radial position indicates the current NRRO of read/write head 127, i.e., the radial offset from the ideal or intended radial location of read/write head 127. Based on this offset, microprocessor-based controller 133 may cause read/write head 127 to move, via voice coil motor 128, from the second radial position to a third radial position. In some embodiments, microprocessor-based controller 133 may also control the radial velocity and acceleration of read/write head 127 based on the radial offset indicated by the second radial position. Steps 704-708 are then repeated as the radial position of read/write head 127 is controlled using reference spirals 210 for position and timing information. The implementation of method 700 enables the positioning of a magnetic head during an SSW process in the presence of large NRRO. It is noted that method 700, as described above, represents a portion of such an SSW process.

Figure 8:
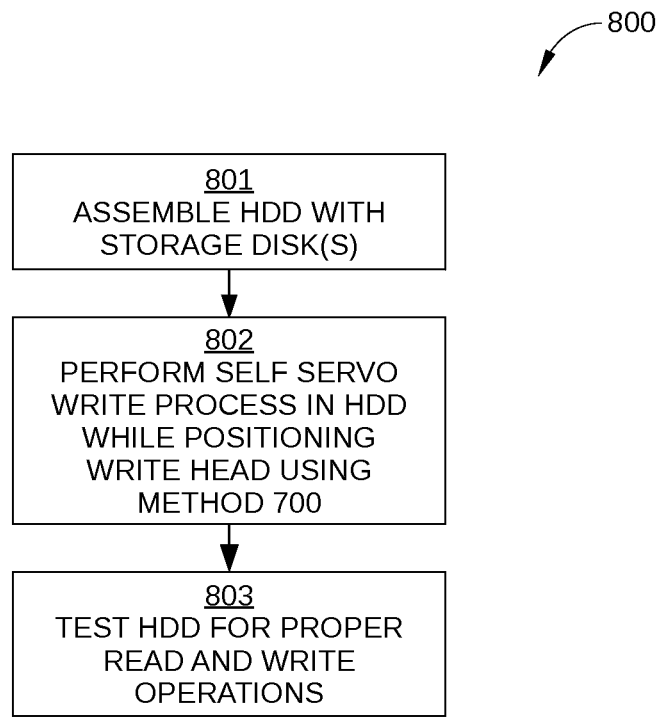
FIG. 8 sets forth a flowchart of method steps for manufacturing the hard disk drive of FIG. 1, according to an embodiment.

FIG. 8 sets forth a flowchart of method steps for manufacturing HDD 100, according to an embodiment. Although the method steps are described in conjunction with HDD 100 in FIGS. 1-7, persons skilled in the art will understand that the method steps may also be performed for manufacturing other types of hard disk drives.

As shown, method 800 begins at step 801, where HDD 100 is assembled, including the incorporation of multiple storage disks 110 in the housing of HDD 100. In step 802, an SSW process is performed by assembled HDD 100. Specifically, reference spirals 210 are written on one or more surfaces of storage disk(s) 110. Servo wedges are then written on the storage surfaces of storage disks 110 while the servo system of HDD 100 uses closed-loop tracking of the reference spirals. During the closed-loop tracking of the reference spirals, a magnetic head of HDD 100 is positioned using method 700, as set for the above. In step 803, HDD 100 is tested for proper writing and reading operations.

In sum, embodiments herein provide systems and methods for positioning a magnetic head during a self-servo writing process. The spiral gate for monitoring a particular reference spiral is timed to begin at a time based on the radial position of the magnetic head when crossing the preceding reference spiral. In this way, the spiral crossing time for the particular reference spiral can be estimated with sufficient accuracy that the spiral gate coincides with the magnetic head crossing the particular reference spiral. Consequently, spiral detection is assured, even in the presence of large NRRO.

While the foregoing is directed to embodiments of the present invention, other and further embodiments of the invention may be devised without departing from the basic scope thereof, and the scope thereof is determined by the claims that follow.

We claim:

1. A method of positioning a write head based on position signals generated by a read head as the read head crosses a plurality of reference spirals, including first and second spirals that are adjacent, the method comprising:
   demodulating the position signals generated by the read head as the read head crosses the first spiral during a first demodulation period; and
   demodulating the position signals generated by the read head as the read head crosses the second spiral during a second demodulation period that is determined based on the demodulated position signals obtained during the first demodulation period.

2. The method of claim 1, wherein demodulating the position signals generated by the read head as the read head crosses the first spiral comprises determining a first radial position of the write head.

3. The method of claim 2, further comprising, based on the first radial position of the write head, determining a start time for the second demodulation period.

4. The method of claim 3, wherein determining the start time for the second demodulation period comprises determining a predicted crossing time at which the read head crosses the second spiral.

5. The method of claim 4, wherein determining the start time for the second demodulation period comprises selecting the start time so that the predicted crossing time occurs in the second demodulation period.

6. The method of claim 1, wherein demodulating the position signals generated by the read head as the read head crosses the second spiral comprises determining a second radial position of the write head.

7. The method of claim 6, further comprising, based on the second radial position, controlling the write head to move from the second radial position to a third radial position.

8. The method of claim 1, wherein demodulating the position signals generated by the read head as the read head crosses the first spiral comprises determining a first radial position of the write head and a first radial velocity of the write head, and further comprising, based on the first radial position and the first radial velocity, determining the second demodulation period.

9. The method of claim 1, wherein the second demodulation period is the first demodulation period to occur after the first demodulation period.

10. The method of claim 1, further comprising:
    demodulating the position signals generated by the read head during a third demodulation period as the read head crosses a third spiral that is adjacent to the first spiral; and
    determining the second demodulation period based on the demodulated position signals obtained during the first demodulation period and the third demodulation period.

11. The method of claim 10, wherein the first demodulation period is the first demodulation period to occur after the third demodulation period.

12. A data storage device comprising:
    a rotatable disk with a writable surface; and
    a controller configured to position a write head based on position signals generated by a read head as the read head crosses a plurality of reference spirals, including first and second spirals that are adjacent by:
       demodulating the position signals generated by the read head as the read head crosses the first spiral during a first demodulation period; and
       demodulating the position signals generated by the read head as the read head crosses the second spiral during a second demodulation period that is determined based on the demodulated position signals obtained during the first demodulation period.

13. The data storage device of claim 12, wherein demodulating the position signals generated by the read head as the read head crosses the first spiral comprises determining a first radial position of the write head.

14. The data storage device of claim 12, wherein demodulating the position signals generated by the read head as the read head crosses the first spiral comprises determining a first radial position of the write head and a first radial velocity of the write head, and further comprising, based on the first radial position and the first radial velocity, determining the second demodulation period.

15. A method of manufacturing a hard disk drive, the method comprising:
    incorporating a storage disk in a housing of the hard disk drive;
    forming a plurality of reference spirals, including first and second spirals that are adjacent, on a surface of the storage disk; and
    positioning a write head based on position signals generated by a read head as the read head crosses the plurality of reference spirals by:
       demodulating the position signals generated by the read head as the read head crosses the first spiral during a first demodulation period; and
       demodulating the position signals generated by the read head as the read head crosses the second spiral during a second demodulation period that is determined based on the demodulated position signals obtained during the first demodulation period.

16. The method of claim 15, wherein demodulating the position signals generated by the read head as the read head crosses the first spiral comprises determining a first radial position of the write head.

17. The method of claim 15, wherein demodulating the position signals generated by the read head as the read head crosses the second spiral comprises determining a second radial position of the write head.

18. The method of claim 15, wherein demodulating the position signals generated by the read head as the read head crosses the first spiral comprises determining a first radial position of the write head and a first radial velocity of the write head, and further comprising, based on the first radial position and the first radial velocity, determining the second demodulation period.

19. The method of claim 15, wherein the second demodulation period is the first demodulation period to occur after the first demodulation period.

20. The method of claim 15, further comprising:
   demodulating the position signals generated by the read head during a third demodulation period as the read head crosses a third spiral that is adjacent to the first spiral; and
   determining the second demodulation period based on the demodulated position signals obtained during the first demodulation period and the third demodulation period.

* * * * *